United States Patent
Barber et al.

(10) Patent No.: US 10,650,011 B2
(45) Date of Patent: May 12, 2020

(54) EFFICIENT PERFORMANCE OF INSERT AND POINT QUERY OPERATIONS IN A COLUMN STORE

(71) Applicant: International Business Machines Corporation, Armonk, NY (US)

(72) Inventors: Ronald J. Barber, San Jose, CA (US); Bishwaranjan Bhattacharjee, Yorktown Heights, NY (US); Mohammad Sadoghi Hamedani, Chappaqua, NY (US); Guy M. Lohman, San Jose, CA (US); Chandrasekaran Mohan, San Jose, CA (US); Ippokratis Pandis, Palo Alto, CA (US); Vijayshankar Raman, Sunnyvale, CA (US); Richard S. Sidle, Mountain View, CA (US); Adam J. Storm, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 14/664,686

(22) Filed: Mar. 20, 2015

(65) Prior Publication Data

US 2016/0275171 A1 Sep. 22, 2016

(51) Int. Cl.
*G06F 16/245* (2019.01)
*G06F 16/2458* (2019.01)

(52) U.S. Cl.
CPC ................ *G06F 16/2465* (2019.01)

(58) Field of Classification Search
CPC ............ G06F 3/0647; G06F 17/30539; G06F 16/2255; G06F 16/2456; G06F 16/2465
See application file for complete search history.

(56) References Cited

U.S. PATENT DOCUMENTS 5,455,826 A 10/1995 Ozveren et al.
5,598,559 A 1/1997 Chaudhuri
(Continued)

FOREIGN PATENT DOCUMENTS

CN 1522409 A 8/2004
CN 1968212 A 5/2007
(Continued)

OTHER PUBLICATIONS

Raman et al. ("DB2 with BLU Acceleration: So Much More than Just a Column Store", Proceedings of the VLDB Endowment, vol. 6, No. 1, Aug. 26-30, 2013, Riva del Garda, Trento, Italy). (Year: 2013).*

(Continued)

*Primary Examiner* — Shew Fen Lin
(74) *Attorney, Agent, or Firm* — Sherman IP LLP; Kenneth L. Sherman; Steven Laut

(57) ABSTRACT

A method includes logically organizing, by an object hierarchy processor, data objects in a first hierarchy. A portion of the data objects in the first hierarchy logically includes groupings of other data objects. The object hierarchy processor physically organizes the data objects across two or more types of memory in a second hierarchy. Another portion of the data objects in the second hierarchy physically includes groupings of other data objects. Groupings of the data objects in the second hierarchy are dynamically moved across the two or more types of memory. Levels of access of the data objects are tracked using a data structure that maps groupings of the data objects in the first hierarchy onto metadata information including combined access frequencies of the data objects, and current number of accessors to the data objects, in each grouping of the data objects.

20 Claims, 9 Drawing Sheets

(56) References Cited

U.S. PATENT DOCUMENTS

| | | |
|---|---|---|
| 5,706,495 A | 1/1998 | Chadha et al. |
| 5,740,440 A | 4/1998 | West |
| 5,794,229 A | 8/1998 | French |
| 5,893,086 A | 4/1999 | Schmuck et al. |
| 5,930,785 A | 7/1999 | Lohman et al. |
| 6,026,394 A | 2/2000 | Tsuchida et al. |
| 6,052,697 A | 4/2000 | Bennett |
| 6,134,601 A * | 10/2000 | Spilo ............... G06F 9/50 719/328 |
| 6,247,014 B1 | 6/2001 | Ladwig et al. |
| 6,292,795 B1 | 9/2001 | Peters et al. |
| 6,505,189 B1 | 1/2003 | On Au et al. |
| 6,609,131 B1 | 8/2003 | Zait et al. |
| 6,757,677 B2 | 6/2004 | Pham et al. |
| 6,775,681 B1 | 8/2004 | Ballamkonda et al. |
| 6,937,652 B2 | 8/2005 | Gold et al. |
| 6,941,432 B2 | 9/2005 | Ronstrom |
| 6,954,776 B1 | 10/2005 | Cruanes et al. |
| 7,062,481 B2 | 6/2006 | Pham et al. |
| 7,287,131 B1 | 10/2007 | Martin et al. |
| 7,293,028 B2 | 11/2007 | Cha et al. |
| 7,308,539 B2 | 12/2007 | Fuhs et al. |
| 7,343,363 B1 | 3/2008 | Parker |
| 7,412,439 B2 | 8/2008 | Bossman et al. |
| 7,499,960 B2 | 3/2009 | Dageville et al. |
| 7,653,670 B2 | 1/2010 | Hasan et al. |
| 7,688,758 B2 | 3/2010 | Denby et al. |
| 7,716,180 B2 | 5/2010 | Vermeulen et al. |
| 7,827,182 B1 | 11/2010 | Panigrahy |
| 7,827,218 B1 | 11/2010 | Mittal |
| 7,868,789 B1 | 1/2011 | Binnig et al. |
| 8,078,593 B1 | 12/2011 | Ramarao et al. |
| 8,145,642 B2 | 3/2012 | Cruanes et al. |
| 8,195,644 B2 | 6/2012 | Xu |
| 8,271,564 B2 | 9/2012 | Dade |
| 8,321,385 B2 | 11/2012 | Burroughs et al. |
| 8,346,810 B2 | 1/2013 | Beaverson et al. |
| 8,370,316 B2 | 2/2013 | Bensberg et al. |
| 8,438,574 B1 | 5/2013 | Lyle et al. |
| 8,443,155 B2 | 5/2013 | Adams et al. |
| 8,661,005 B2 | 2/2014 | McKenney et al. |
| 8,692,695 B2 | 4/2014 | Fallon et al. |
| 8,768,889 B1 | 7/2014 | Martin |
| 8,768,927 B2 | 7/2014 | Yoon et al. |
| 8,832,025 B2 | 9/2014 | Arai et al. |
| 8,886,614 B2 | 11/2014 | Morris |
| 9,092,141 B2 | 7/2015 | Hayashi et al. |
| 9,298,723 B1 | 3/2016 | Vincent |
| 9,355,060 B1 * | 5/2016 | Barber ............ H04L 67/1097 |
| 9,454,560 B2 | 9/2016 | Cha et al. |
| 9,626,421 B2 | 4/2017 | Plattner et al. |
| 9,684,682 B2 * | 6/2017 | Mukherjee ........ G06F 16/221 |
| 9,792,318 B2 * | 10/2017 | Schreter ........... G06F 16/2365 |
| 2001/0039609 A1 * | 11/2001 | Houldsworth ....... G06F 12/023 711/170 |
| 2002/0016820 A1 | 2/2002 | DuVal et al. |
| 2003/0065898 A1 * | 4/2003 | Flamma ............. G06F 3/0601 711/165 |
| 2004/0260684 A1 | 12/2004 | Agrawal et al. |
| 2005/0018683 A1 | 1/2005 | Zaho et al. |
| 2005/0033741 A1 | 2/2005 | Dombroski et al. |
| 2006/0015529 A1 * | 1/2006 | Yagawa ............ G06F 17/30067 |
| 2006/0218176 A1 | 9/2006 | Sun Hsu et al. |
| 2007/0136317 A1 | 6/2007 | Przywara |
| 2007/0208788 A1 | 9/2007 | Chakravarty et al. |
| 2007/0244850 A1 | 10/2007 | Hoppe et al. |
| 2007/0245119 A1 | 10/2007 | Hoppe |
| 2008/0126706 A1 | 5/2008 | Newport et al. |
| 2008/0133583 A1 | 6/2008 | Artan et al. |
| 2008/0162402 A1 | 7/2008 | Holmes et al. |
| 2009/0006399 A1 | 1/2009 | Raman et al. |
| 2009/0024568 A1 | 1/2009 | Al-Omari et al. |
| 2009/0100223 A1 * | 4/2009 | Murayama .......... G06F 3/0605 711/114 |
| 2009/0187586 A1 | 7/2009 | Olson |
| 2009/0210445 A1 | 8/2009 | Draese et al. |
| 2009/0222659 A1 | 9/2009 | Miyabayashi et al. |
| 2010/0088309 A1 | 4/2010 | Petculescu et al. |
| 2010/0114868 A1 | 5/2010 | Beavin et al. |
| 2010/0131540 A1 | 5/2010 | Xu et al. |
| 2010/0199066 A1 | 8/2010 | Artan et al. |
| 2010/0223253 A1 | 9/2010 | Gopal et al. |
| 2011/0060876 A1 | 3/2011 | Liu |
| 2011/0066593 A1 | 3/2011 | Ahluwalia et al. |
| 2011/0078134 A1 | 3/2011 | Bendel et al. |
| 2011/0107021 A1 * | 5/2011 | Muthukumarasamy ......... G06F 12/0207 711/104 |
| 2011/0283082 A1 | 11/2011 | McKenney et al. |
| 2011/0307471 A1 | 12/2011 | Sheinin |
| 2012/0011133 A1 | 1/2012 | Faerber et al. |
| 2012/0011144 A1 | 1/2012 | Transier et al. |
| 2012/0036134 A1 | 2/2012 | Malakhov |
| 2012/0117055 A1 | 5/2012 | Al-omari et al. |
| 2012/0136846 A1 | 5/2012 | Song et al. |
| 2012/0136889 A1 | 5/2012 | Jagannathan et al. |
| 2012/0143877 A1 | 6/2012 | Kumar et al. |
| 2012/0158729 A1 | 6/2012 | Mital et al. |
| 2012/0166400 A1 | 6/2012 | Sinclair et al. |
| 2012/0173517 A1 | 7/2012 | Lang et al. |
| 2012/0260349 A1 | 10/2012 | Nagai et al. |
| 2012/0303633 A1 | 11/2012 | He et al. |
| 2012/0310917 A1 | 12/2012 | Sheinin et al. |
| 2012/0331249 A1 * | 12/2012 | Benjamin ............ G06F 3/0607 711/162 |
| 2013/0046949 A1 * | 2/2013 | Colgrove ............ G06F 3/0608 711/170 |
| 2013/0138628 A1 | 5/2013 | Bensberg et al. |
| 2013/0218934 A1 | 8/2013 | Lin et al. |
| 2013/0325900 A1 | 12/2013 | Barber et al. |
| 2014/0006379 A1 | 1/2014 | Arndt et al. |
| 2014/0006382 A1 * | 1/2014 | Barber ............ G06F 17/30463 707/718 |
| 2014/0025648 A1 | 1/2014 | Corbett et al. |
| 2014/0074819 A1 | 3/2014 | Idicula |
| 2014/0108489 A1 | 4/2014 | Glines et al. |
| 2014/0129568 A1 | 5/2014 | Kim et al. |
| 2014/0181052 A1 | 6/2014 | Moore et al. |
| 2014/0214794 A1 | 7/2014 | Attaluri et al. |
| 2014/0214795 A1 | 7/2014 | Attaluri et al. |
| 2014/0214855 A1 | 7/2014 | Attaluri |
| 2014/0215019 A1 | 7/2014 | Ahrens |
| 2014/0337375 A1 | 11/2014 | Yue |
| 2014/0372388 A1 | 12/2014 | Allaluri et al. |
| 2014/0372392 A1 | 12/2014 | Attaluri |
| 2015/0058293 A1 | 2/2015 | Kobayashi et al. |
| 2015/0088813 A1 * | 3/2015 | Lahiri ............... G06F 16/21 707/609 |
| 2015/0089134 A1 * | 3/2015 | Mukherjee ......... G06F 16/221 711/114 |
| 2015/0301743 A1 * | 10/2015 | Nagao ................ G06F 11/34 711/113 |
| 2016/0147457 A1 * | 5/2016 | Legler ............... G06F 16/221 707/601 |
| 2016/0147821 A1 * | 5/2016 | Schreter ........... G06F 17/30371 707/703 |
| 2016/0232169 A1 | 8/2016 | Archak et al. |

FOREIGN PATENT DOCUMENTS

| | | |
|---|---|---|
| CN | 101013427 A1 | 8/2007 |
| CN | 101067822 A1 | 11/2007 |
| CN | 1003672239 C | 2/2008 |
| CN | 101231657 A | 7/2008 |
| CN | 101388042 A | 3/2009 |
| CN | 101828182 A | 9/2010 |
| CN | 102893265 A | 1/2013 |
| CN | 103635902 A | 3/2014 |
| CN | 104021205 A | 9/2014 |
| CN | 104317966 A | 1/2015 |
| EP | 0457707 A2 | 11/1991 |
| JP | 2007234026 A | 9/2007 |
| JP | 2010539616 A | 12/2012 |

(56) References Cited

FOREIGN PATENT DOCUMENTS

| | | | | |
|---|---|---|---|---|
| JP | 2013222457 | A | 10/2013 | |
| WO | 2011148496 | | 12/2011 | |
| WO | 2013141308 | A | 9/2013 | |
| WO | 2014010038 | A | 1/2014 | |
| WO | 2014045441 | A | 3/2014 | |
| WO | WO 2015078136 | A1 * | 6/2015 | ......... G06F 17/3015 |

OTHER PUBLICATIONS

List of IBM Patents or Patent Applications Treated as Related.

Internet Society, et al., "The VCDIFF Generic Differencing and Compression Data Format (RFC3284)", Jul. 1, 2002, pp. 1-31, Network Working Group, IP.com, United States.

Lehman, T.J. "Design and Performance Evaluation of a Main Memory Relational Database System." 1986, PhD Dissertation, 334 pages, [Abstract Only], University of Washington, Madison, WI.

Leis, V., et al., "The Adaptive Radix Tree: ARTful Indexing for Main-Memory Databases", IEEE 29th International Conference on Data Engineering (ICDE), Apr. 8, 2013, pp. 38-49, IEEE, United States.

Levandoski, J., et al., "The Bw-Tree: A B-tree for New Hardware Platforms", IEEE 29th International Conference on Data Engineering (ICDE), Apr. 8, 2013, pp. 1-12, IEEE, United States.

Prokopec, A. et al., "Lock-Free Resizeable Concurrent Tries", Languages and Compilers for Parallel Computing, 2013, pp. 156-170, vol. 7146, Springer Berlin Heidelberg, Germany.

Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library, United States.

Pandis, I. et al., "PLP: Page Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10, United States.

Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29, 2011-Sep. 3, 2011, pp. 795-806, vol. 4, No. 11, United States.

Gao, H. et al., "Lock-free dynamic hash tables with open addressing", Journal of Distributed Computing, Jul. 2005, pp. 21-42, vol. 18, Issue 1, United Kingdom.

Xu, Y., "A Multi-Dimensional Progressive Perfect Hashing for High-Speed String Matching", Seventh ACM/ IEEE Symposium on Architectures for Networking and Communications Systems, 2011, pp. 167-177, IEEE Computer Society, United States.

Marek, R., et al., "TID Hash Joins," CIKM, 1994, pp. 42-49, Gaithersburg, MD, United States.

Yan, Weipeng P. et al., "Performing Group-By before Join [query processing]," Proceedings 1oth International Conference on Data Engineering, 1994, pp. 89-100, IEEE, 1994.

List of IBM Patents or Patent Applications Treated as Related Form.

Anonymous, "System and Method for Usage Aware Row Storage in Database Systems", Jul. 23, 2010, pp. 1-4, ip.com, United States.

Anonymous, "High Performance Technique Using Join Collocation in a Massively Parallel Processing Relational Database Implementation", Jun. 14, 2012, pp. 1-5, IP.com, United States.

Anonymous, "CashMap: Processor Cache-Aware Implementation of Hash Tables", Jul. 5, 2013, pp. 1-7, IP.com, United States.

Anonymous, "Efficient Grouping Over Joins of Compressed Tables", Apr. 6, 2010, pp. 1-6, IP.com, United States.

Korn, D., et al., "The VCDIFF Generic Differencing and Compression Data Format (RFC3284)", Jul. 1, 2002, pp. 1-31, Network Working Group, IP.com, United States.

Hu, K. et al. "Rapid multi-dimension hierarchical algorithm in data warehouse system", Computer Integrated Manufacturing Systems, Jan. 2007, pp. 196-201, vol. 13, No. 1, China [English-language translation: Abstract Only].

Spyros, B., et al., "Design and Evaluation of Main Memory Hash Join Algorithms for Multi-core CPUs", SIGMOD Int'l Conference on Management of Data, Jun. 12, 2011, pp. 1-12, ACM, United States.

Raman, V., et al., "DB2 with BLU Acceleration: So Much More than Just a Column Store", Proceedings of the VLDB Endowment, Aug. 2013, pp. 1-12, vol. 6, No. 11, ACM, United States.

Mell, P., et al., "The NIST Definition of Cloud Computing", National Institute of Standards and Technology Special Publication 800-145, Sep. 2011, pp. 1-7, U.S. Department of Commerce, United States.

List of IBM Patents or Applications Treated as Related; Attaluri, G.K., U.S. Appl. No. 16/427,190, filed May 30, 2019.

U.S. Non-Final Office Action for U.S. Appl. No. 14/671,692 dated Aug. 23, 2017.

U.S. Non-Final Office Action for U.S. Appl. No. 14/671,692 dated Feb. 26, 2018.

U.S. Final Office Action for U.S. Appl. No. 14/671,692 dated Sep. 20, 2018.

U.S. Advisory Action for U.S. Appl. No. 14/671,692 dated Nov. 29, 2018.

U.S. Non-Final Office Action for U.S. Appl. No. 14/705,377 dated Sep. 26, 2017.

U.S. Final Office Action for U.S. Appl. No. 14/705,377 dated Jan. 25, 2018.

U.S. Notice of Allowance for U.S. Appl. No. 14/705,377 dated May 29, 2018.

U.S. Notice of Allowance for U.S. Appl. No. 14/705,377 dated Nov. 7, 2018.

U.S. Notice of Allowance for U.S. Appl. No. 14/705,377 dated Apr. 10, 2019.

U.S. Notice of Allowance for U.S. Appl. No. 14/705,377 dated May 29, 2019.

U.S. Notice of Allowance for U.S. Appl. No. 14/705,377 dated Jul. 16, 2019.

U.S. Non-Final Office Action for U.S. Appl. No. 15/150,493 dated Dec. 15, 2017.

U.S. Final Office Action for U.S. Appl. No. 15/150,493 dated Jul. 11, 2018.

U.S. Advisory Action for U.S. Appl. No. 15/150,493 dated Oct. 16, 2018.

U.S. Non-Final Office Action for U.S. Appl. No. 15/150,493 dated Jan. 11, 2019.

U.S. Non-Final Office Action for U.S. Appl. No. 15/850,363 dated Feb. 4, 2019.

U.S. Notice of Allowance for U.S. Appl. No. 15/850,363 dated Apr. 30, 2019.

U.S. Non-Final Office Action for U.S. Appl. No. 15/850,383 dated Feb. 19, 2019.

U.S. Notice of Allowance for U.S. Appl. No. 15/850,383 dated Apr. 12, 2019.

U.S. Non-Final Office Action for U.S. Appl. No. 14/664,714 dated May 4, 2017.

U.S. Final Office Action for U.S. Appl. No. 14/664,714 dated Aug. 15, 2017.

U.S. Advisory Action for U.S. Appl. No. 14/664,714 dated Oct. 11, 2017.

U.S. Non-Final Office Action for U.S. Appl. No. 14/664,714 dated Feb. 13, 2018.

U.S. Corrected Non-Final Office Action for U.S. Appl. No. 14/664,714 dated Feb. 21, 2018.

U.S. Final Office Action for U.S. Appl. No. 14/664,714 dated Jun. 18, 2018.

U.S. Advisory Action for U.S. Appl. No. 14/664,714 dated Aug. 23, 2018.

U.S. Notice of Allowance for U.S. Appl. No. 14/664,714 dated Jan. 14, 2019.

U.S. Non-Final Office Action for U.S. Appl. No. 14/671,664 dated Aug. 28, 2017.

U.S. Final Office Action for U.S. Appl. No. 14/671,664 dated Jan. 18, 2018.

U.S. Advisory Action for U.S. Appl. No. 14/671,664 dated Apr. 18, 2018.

(56) References Cited

OTHER PUBLICATIONS

U.S. Notice of Allowance for U.S. Appl. No. 14/671,664 dated May 29, 2018.
U.S. Corrected Notice of Allowability for U.S. Appl. No. 14/671,664 dated Aug. 30, 2018.
U.S. Restriction Requirement for U.S. Appl. No. 14/664,710 dated Jul. 18, 2017.
U.S. Non-Final Office for U.S. Appl. No. 14/664,710 dated Aug. 23, 2017.
U.S. Notice of Allowance for U.S. Appl. No. 14/664,710 dated Nov. 7, 2017.
U.S. Non-Final Office Action for U.S. Appl. No. 13/918,302 dated Jun. 17, 2015.
U.S. Final Office Action for U.S. Appl. No. 13/918,302 dated Dec. 31, 2015.
U.S. Notice of Allowance for U.S. Appl. No. 13/918,302 dated Mar. 14, 2016.
U.S. Non-Final Office Action for U.S. Appl. No. 14/070,990 dated Jun. 15, 2015.
U.S. Final Office Action for U.S. Appl. No. 14/070,990 dated Dec. 18, 2015.
U.S. Notice of Allowance for U.S. Appl. No. 14/070,990 dated Mar. 25, 2016.
U.S. Non-Final Office Action for U.S. Appl. No. 13/918,313 dated May 21, 2015.
U.S. Notice of Allowance for U.S. Appl. No. 13/918,313 dated Oct. 5, 2015.
U.S. Notice of Allowance for U.S. Appl. No. 13/918,313 dated Jan. 29, 2016.
U.S. Corrected Notice of Allowability for U.S. Appl. No. 13/918,313 dated Mar. 3, 2016.
U.S. Non-Final Office Action for U.S. Appl. No. 14/615,982 dated May 22, 2015.
U.S. Notice of Allowance for U.S. Appl. No. 14/615,982 dated Oct. 14, 2015.
U.S. Notice of Allowance for U.S. Appl. No. 14/615,982 dated Jan. 25, 2016.
U.S. Corrected Notice of Allowability for U.S. Appl. No. 14/615,982 dated Mar. 3, 2016.
U.S. Non-Final Office Action for U.S. Appl. No. 13/753,740 dated Dec. 17, 2014.
U.S. Notice of Allowance for U.S. Appl. No. 13/753,740 dated Apr. 15, 2015.
U.S. Notice of Allowance for U.S. Appl. No. 13/753,740 dated Aug. 21, 2015.
U.S. Notice of Allowance for U.S. Appl. No. 13/753,740 dated Jan. 15, 2016.
U.S. Non-Final Office Action for U.S. Appl. No. 14/471,079 dated Oct. 8, 2015.
U.S. Final Office Action for U.S. Appl. No. 14/471,079 dated Feb. 17, 2016.
U.S. Notice of Allowance for U.S. Appl. No. 14/471,079 dated May 11, 2016.
U,S. Notice of Allowance for U.S. Appl. No. 14/471,079 dated Jul. 1, 2016.
U.S. Notice of Allowance for U.S. Appl. No. 14/471,079 dated Oct. 7, 2016.
U.S. Notice of Allowance for U.S. Appl. No. 14/471,079 dated Feb. 1, 2017.
U.S. Non-Final Office Action for U.S. Appl. No. 13/753,769 dated Nov. 21, 2014.
U.S. Notice of Allowance for U.S. Appl. No. 13/753,769 dated Sep. 14, 2015.
U.S. Notice of Allowance for U.S. Appl. No. 13/753,769 dated Jan. 21, 2016.
U.S. Notice of Allowance for U.S. Appl. No. 14/471,272 dated Oct. 29, 2015.
U.S. Non-Final Office Action for U.S. Appl. No. 14/509,336 dated Oct. 5, 2016.
U.S. Notice of Allowance for U.S. Appl. No. 14/509,336 dated Feb. 1, 2017.
U.S. Notice of Allowance for U.S. Appl. No. 15/150,493 dated Nov. 6, 2019.
Yan, W.P. et al., "Performing Group-By Before Join", Proceedings 10th Int'l Conference on Data Engineering, 1994, pp. 1-30, IEEE, United States.
Cleary, J.G., "Compact Hash Tables Using Bidirectional Linear Probing", IEEE Transactions on Computers, Sep. 1994, pp. 828-834, vol. C-33, No. 9, United States.
Nan Hua. H., et al., "Rank-Indexed Hashing: A Compact Construction of Bloom Filters and Variants", IEEE, 2008, pp. 73-82, United States.
Xu, Y., "A Multi-Dimesional Progressive Perfect Hashing for High-Speed String Matching", Seventh ACM/ IEEE Symposium on Architectures for Networking and Communications Systems, 2011, pp. 167-177, IEEE Computer Society, United States.
Chang. S., "Recent Advances Of Compact Hashing for Large-Scale Visual Search", Columbia University, Oct. 2012, pp. 1-44, United States.
Wang, W., et al.; "Investigating Memory Optimization of Hash-index for Next Generation Sequencing on Multi-core Architecture", IPDPSW IEEE 26th Inter. Conf., May 21-25, 2012, pp. 665-674, IEEE Computer Society, United States.
Cutt, B., et al.; "Improving Join Performance for Skewed Databases", IEEE, 2008, pp. 1-5, United States.
Li, Q., et al.; "Adaptively Reordering Joins during Query Execution", IEEE, 2007, pp. 26-35, United States.
U.S. Appl. No. 14/509,336, "Embracing and Exploiting Data Skew During a Join or Groupby", filed Oct. 8, 2014, 38 pages, United States.
U.S. Non-Final Office Action for U.S. Appl. No. 14/671,692 dated Mar. 19, 2020.

\* cited by examiner

EFFICIENT PERFORMANCE OF INSERT AND POINT QUERY OPERATIONS IN A COLUMN STORE

BACKGROUND

Embodiments of the invention relate to efficient insert and point query operations in a column store, in particular, for dynamically moving hierarchical data objects across two or more kinds of memories based on tracking levels of access of a subset of the data objects.

There is an increasing trend towards doing business intelligence (BI) queries on real-time data in databases or tabled data. Traditionally, there is a strict separation between BI systems and online transaction processing (OLTP) systems. There is increasing market pressure for operational BI, and for both transactions and analytics to be performed on the same database. For BI, the trend is to lay out data in a column-major layout. This provides better query performance, better buffer pool utilization, and somewhat better compression. OLTP data is traditionally laid out in a row-major layout. But even OLTP workloads are dominated by point queries, which benefit from a column major layout due to better buffer pool utilization and compression; column major can result in an on-disk OLTP workload becoming an in-memory OLTP workload.

SUMMARY

Embodiments of the invention relate to dynamically moving hierarchical data objects across two or more kinds of memories based on tracking levels of access of a set of the data objects. One embodiment includes a method that logically organizes, by an object hierarchy processor, data objects in a first hierarchy. A portion of the data objects in the first hierarchy logically includes groupings of other data objects. The object hierarchy processor physically organizes the data objects across two or more types of memory in a second hierarchy. Another portion of the data objects in the second hierarchy physically includes groupings of other data objects. Groupings of the data objects in the second hierarchy are dynamically moved across the two or more types of memory. Levels of access of the data objects are tracked using a data structure that maps groupings of the data objects in the first hierarchy onto metadata information including combined access frequencies of the data objects, and current number of accessors to the data objects, in each grouping of the data objects.

These and other features, aspects and advantages of the present invention will become understood with reference to the following description, appended claims and accompanying figures.

DETAILED DESCRIPTION

Figure 1:
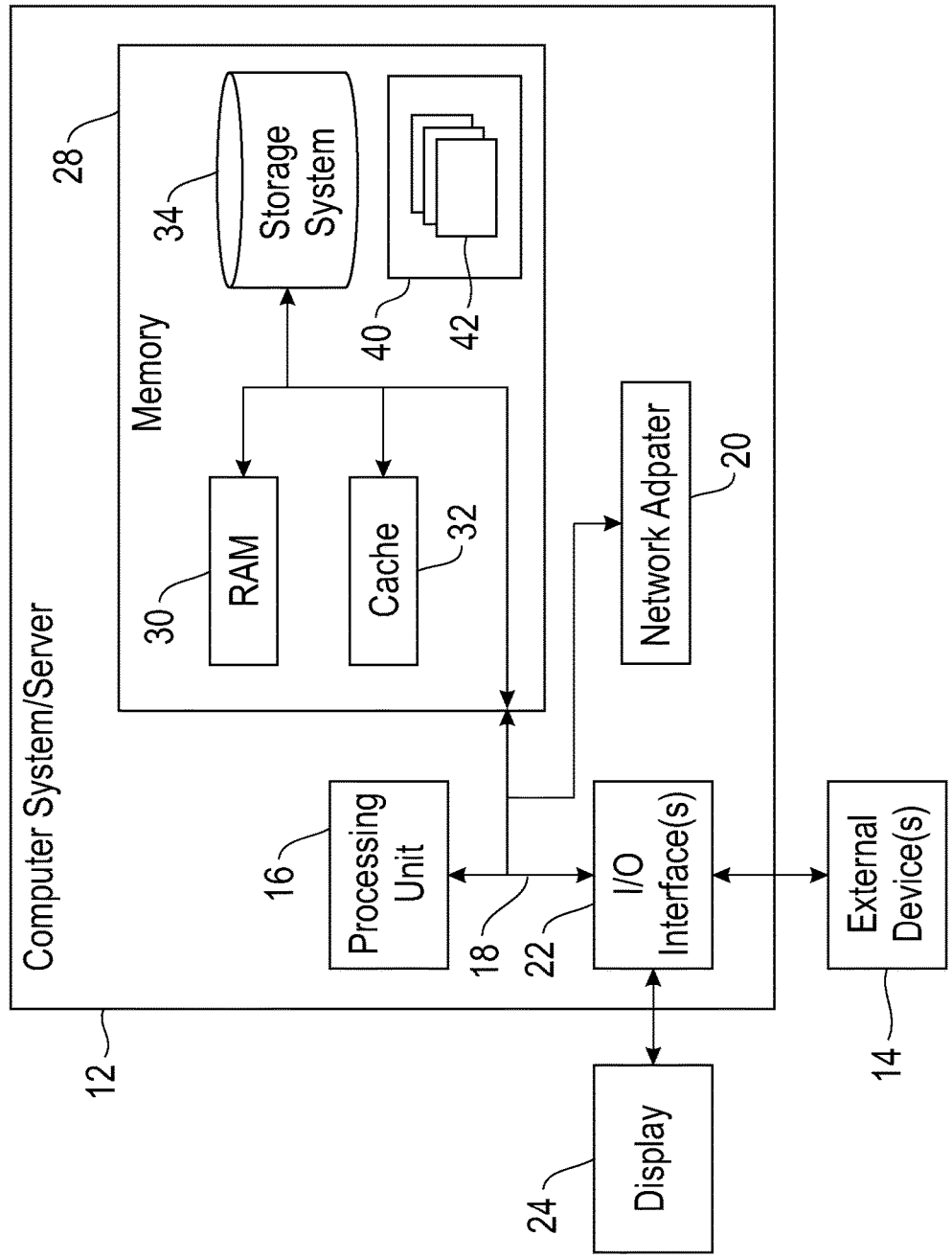
FIG. 1 depicts a cloud computing node, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
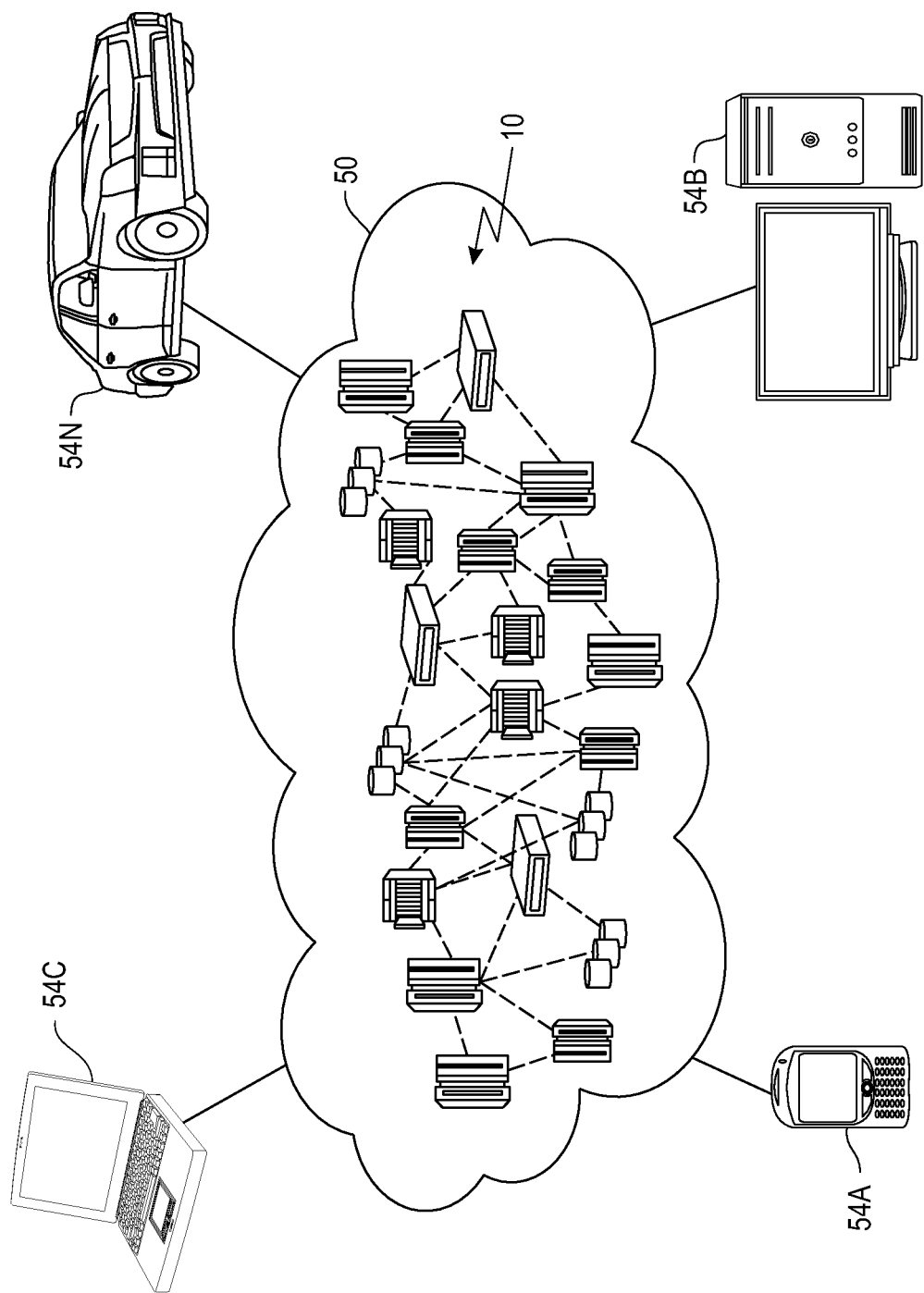
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
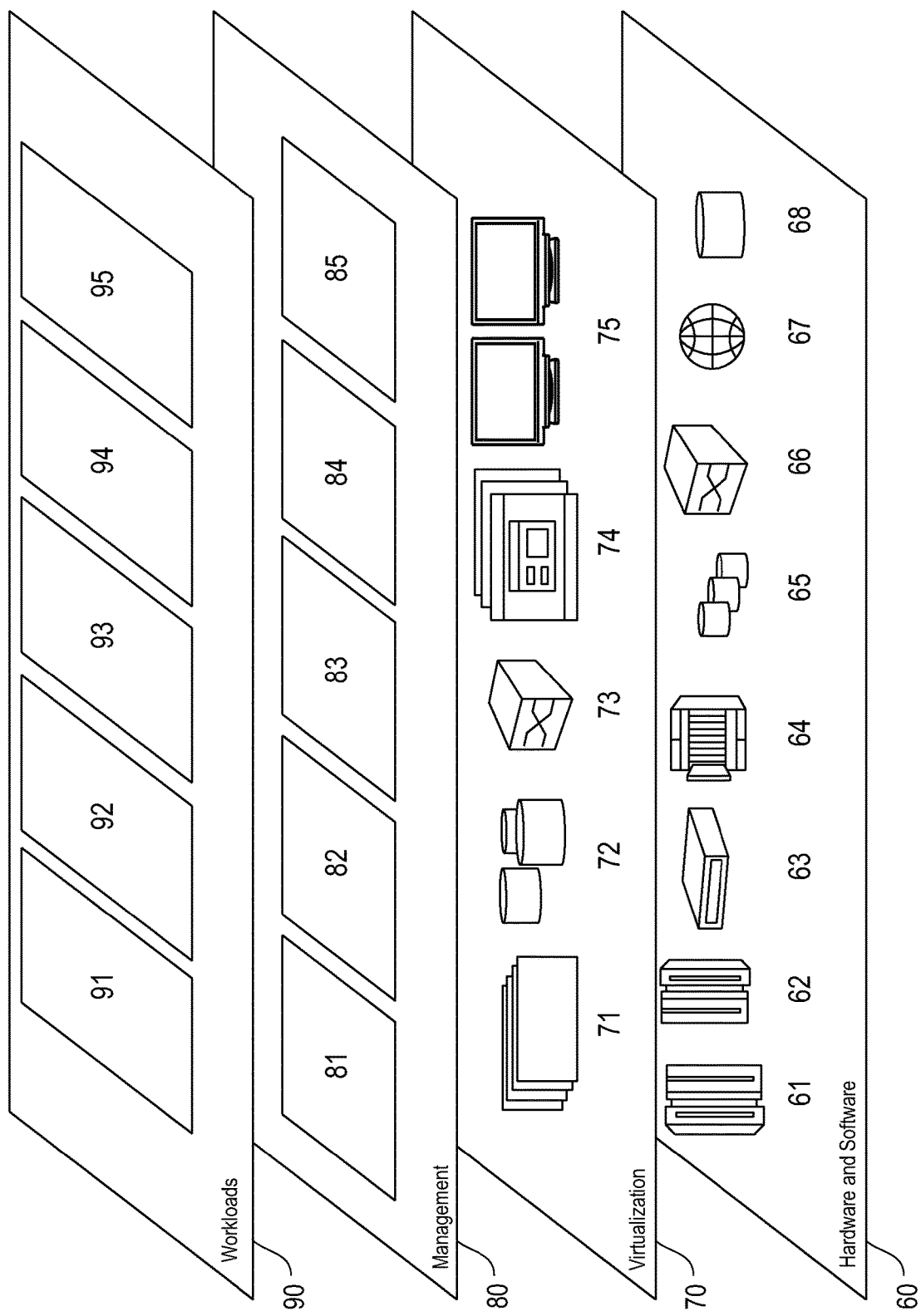
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95. As mentioned above, all of the foregoing examples described with respect to FIG. 3 are illustrative only, and the invention is not limited to these examples.

Figure 4:
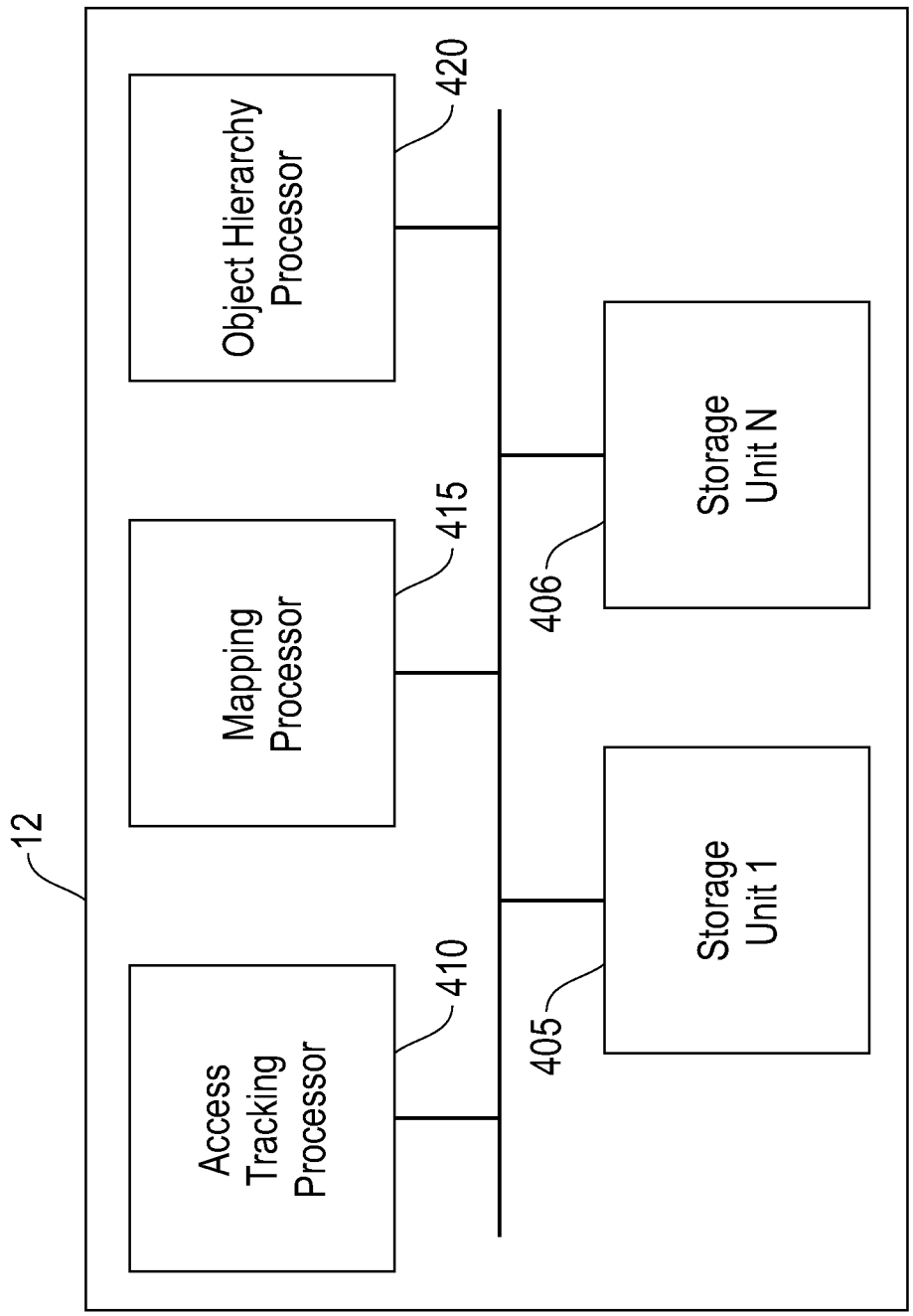
FIG. 4 is a block diagram illustrating a system for dynamically moving hierarchical data objects across two or more kinds of memories based on tracking levels of access of a subset of the data objects, according to an embodiment.

It is understood all functions of one or more embodiments as described herein are typically performed by the system shown in FIG. 4, which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Embodiments of the invention relate to dynamically moving hierarchical data objects across two or more kinds of memories based on tracking levels of access of a set of the data objects. One embodiment includes a method that logically organizing, by an object hierarchy processor, data objects in a first hierarchy. A portion of the data objects in the first hierarchy logically includes groupings of other data objects. The object hierarchy processor physically organizes the data objects across two or more types of memory in a second hierarchy. Another portion of the data objects in the second hierarchy physically includes groupings of other data objects. Groupings of the data objects in the second hierarchy are dynamically moved across the two or more types of memory. Levels of access of the data objects are tracked using a data structure that maps groupings of the data objects in the first hierarchy onto metadata information including combined access frequencies of the data objects, and current number of accessors to the data objects, in each grouping of the data objects.

One or more database operations (e.g., updates (inserts/deletes) or queries (data retrieval)) are typically grouped into a transaction. An update query is used to modify the existing records in a table. Transactions on a database may occur in parallel and do not necessarily commit in the order they are initiated. These events may be recorded in a database transaction log, an event log, etc. Database data storage pages (which are fixed sized, and stored in a contiguous virtual address region in memory) are managed by the buffer pool component of the database system. Operations typically performed by a buffer pool include loading of pages into the buffer pool managed memory, pinning pages in the buffer pool memory to prevent page eviction while the pages are in use, tracking the usage of pages in the buffer pool through reference counting, and the eviction of (unpinned) pages from memory when space is required to load another page.

In one embodiment, data objects are organized in at least two hierarchies. A first hierarchy includes a hierarchy of logical subsumption of data objects, where some objects are comprised of groupings of other data objects. In one example, records are logical groupings of individual values. A superslot is a logical grouping of a certain number of contiguous logical records, which can be identified individually by tuple identifiers. In one example, the tuple identifiers may exist in an ordered numerical sequence, which is referred to as tuple sequence numbers (TSNs). A second hierarchy includes a physical organization of objects across two or more types of memory, where some objects physically contain groupings of other data objects. In one example, this may be memory pages holding individual values. Superslots may be employed for purposes of pinning and unpinning pages (which is usually done to prevent pages from being evicted while in use; this is done be incrementing/decrementing current reference counts) containing different columns of a table in efficient ways by multiple concurrent processes. One embodiment groups contiguous TSNs into the super-slots to avoid contention among concurrent processes (for example, avoiding the acquisition of latches within the buffer pool manager to synchronize concurrent page pinning and unpinning operations) and to determine the location of those TSNs on pages, one page per column of a column store. In one embodiment, the superslot is an across-column data structure that is organized at a granularity of a particular number of rows. In one embodiment, levels of access of sets of the data objects are tracked using a data structure that maps groupings of those objects according to the first hierarchy onto metadata information. This metadata information may include combined access counts, access frequencies, and recent access times for each set. In one embodiment, the superslot may be used as that data structure, and coarse reference counting is performed outside of any database buffer pool in the superslot, while still maintaining separate reference counts for each column. In one embodiment, a direct mapping from row identifier to the virtual memory address of all data pages straddling that row (in any column) are stored in the superslot. In one embodiment, the reference counting used is hierarchical, so that point queries only pull in columns of interest into the buffer pool.

In one embodiment, the movement of data objects across types of memory is performed as per the second (physical) hierarchy. This movement, for each object or set of objects, is controlled by checking the tracked levels of access of overlapping sets in the first hierarchy. In one embodiment, an object or grouping of data objects is allowed to be moved only if the tracked current access count is zero for all overlapping sets in the first hierarchy.

FIG. 4 is a block diagram illustrating a system for dynamically moving hierarchical data objects across two or more kinds of memories based on tracking levels of access of a subset of the data objects, according to an embodiment. In one embodiment, the system includes a server 12 including a storage unit 1 405 through storage unit N 406 (where N is an integer greater than 1), an access tracking processor 410, a mapping processor 415, and an object hierarchy processor 420. In one embodiment, the storage units 1-N 405-406 may be external to the server 12. In one embodiment, the storage units 1-N 405-406 store objects, such as rows/columns/individual values, tables, etc. In a relational database, a table (or file) organizes the information about a single topic into rows and columns. In one embodiment, the storage units 1-N 405-406 are different types of memory storage, such as a buffer pool, cloud based storage, different types of objects pools, etc.

In one embodiment, the object hierarchy processor 420 dynamically moves hierarchical data objects across the storage units 1-N 405-406. In one embodiment, the access tracking processor 410 tracks levels of access of one or more subsets of the hierarchical data objects using a data structure by using the mapping processor 415 to map ranges of sequence numbers of those data objects (e.g., TSNs) onto metadata information, that includes access counts and the locations of one or more memory pages holding the data for those subsets of data objects. In one embodiment, the object hierarchy processor 420 determines which hierarchical data objects to move based on tracked levels of access.

In a column store, every insert into a table has to modify N pages (where N is the number of columns in the table), and similarly every point query has to access M pages (where M is the number of columns referenced in the query). Each such page reference involves updating a reference count in a hash table (e.g., a database management system (DBMS) buffer pool), and possibly acquiring latches (or performing atomic read-modify-write instructions). Accessing a row involves accessing N columns and 2N accesses to hash table or other mapping data structure per point or UDI (update, delete, insert) query, where N is a positive integer: N accesses are needed to map aTSN onto page IDs and N accesses are needed to map page IDs onto buffer pool address (and to increment the reference count for each page). In one embodiment, a superslot data structure that contains 16K TSNs is implemented with system.

In one embodiment, a PageMap is provided as follows: for each column, a list of (startTSN, pagePtr). In one embodiment, only a cache is used for the superslot structure—that is, it is not backed on disk. In one embodiment, the object hierarchy processor 420 uses the superslot data structure to provide for adding a new TSN (allocate space/pages as needed)—upon insert operations. In one embodiment, the mapping processor directly maps TSNs or ranges of TSNs to virtual memory address of columns, or subranges of columns, (or sub-objects) of a table (or object). In one embodiment, a buffer pool pin (a buffer operation to indicate that the page is under use and cannot be moved to another layer of memory) is performed the first time the page is used.

In one embodiment, a hierarchical reference count is maintained at an access granularity of a superslot, which corresponds to a consecutive range of rows (e.g., 16384). In addition, an access count is also maintained for each column within a superslot. This almost entirely avoids overhead for incrementing reference counts per page in a database buffer pool, and is especially efficient in the case that the hot data fits in memory, while still allowing fine grained movement of data between types of memory. For example, individual pages can still be moved. In one embodiment, the mapping processor 415 provides for mapping from a row-wise identifier to a column-wise identifier in a table that is laid out column major. In the following, the TSN refers to the row identifier. The actual data layout is column major, but two common operations produce results in row major layout. First, ingest (load/insert) produces rows to be added to a table. Those rows need to be split up and appended to separate columns. Second, point queries produce TSNs (usually via index lookups), which need to be mapped onto pages for each column. This complicates performance and concurrency. For example, if a conventional buffer pool and an index structure is used to map TSN to page IDs per column, a point query on a table with N columns has to perform 2N hash table accesses, after the secondary index lookup, N for the N pagemaps to map TSN to page IDs; and N buffer pool fixes (which involve N reference count increments) to fix the pages. To avoid this, in one embodiment both reference counting and TSN to page mapping at a TSN granularity is performed by the mapping processor 415, rather than a per-page granularity (as with page map or a conventional buffer pool). In one embodiment, the superslot data structure represents approximately 16384 TSNs.

In one embodiment, a superslot has, for each column, an array of (startTSN, pagePtr). The startTSN is the TSN of the starting TSN in each page, for that column. Boundary pages may be shared among neighbor superslots within each column. In one embodiment, a superslot includes reference counts for each column, in addition to a global reference count that records all active (read or write) references to the rows of the superslot. In one embodiment, in-place updates are not permitted, so the global and per-column counts only track a count of the number of readers. In other embodiments, if in-place updates are allowed, reference counts for the number of writers are also maintained. The pagePtr is a pointer to a page, which may be in the buffer pool or on disk when the memory hierarchy has only two levels: buffer pool and disk. Therefore, the pageptr is a union of (buffer pool page ID, tablespace page ID), where the table space page ID is an identifier for pages on disk. In general, the pagePtr may be a union of pointers across the memory hierarchy, it need not necessarily hold only buffer pool and disk page identifiers.

Figure 5:
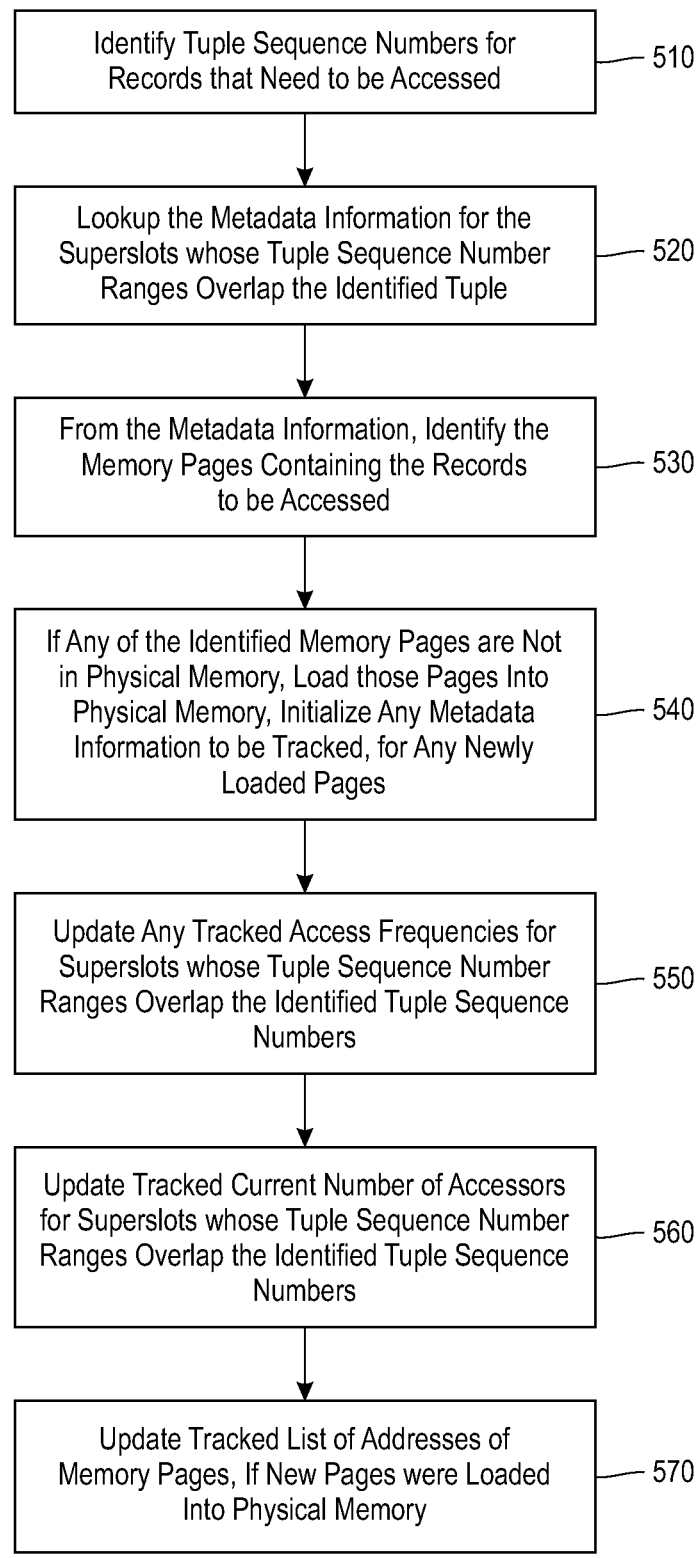
FIG. 5 illustrates a process for accessing records, updating access metadata and loading pages, according to an embodiment.

FIG. 5 illustrates a process for accessing specific records, updating access metadata as needed during such access, and loading into the buffer pool any pages that contain those records and are not already loaded in the buffer pool, according to one embodiment. In one embodiment, block 510, the TSNs corresponding to the records to be accessed are identified. In block 520, the superslots whose TSN ranges overlap with the TSNs of the records to be accessed are identified, and the access metadata for those superslots is looked up. In block 530, from this metadata, the memory pages containing the records to be accessed are determined. In block 540, it is identified whether each of the determined memory pages is in physical memory (in the buffer pool). If any of them are not, those pages are loaded into physical memory. The access metadata is also initialized for these newly loaded pages. In block 550, the current number of accessors is incremented for each of these identified superslots. In one embodiment, in block 560, the access frequencies for these superslots are also updated. In block 570, the list of memory page addresses in the superslots are also updated, for any newly loaded pages.

Figure 6:
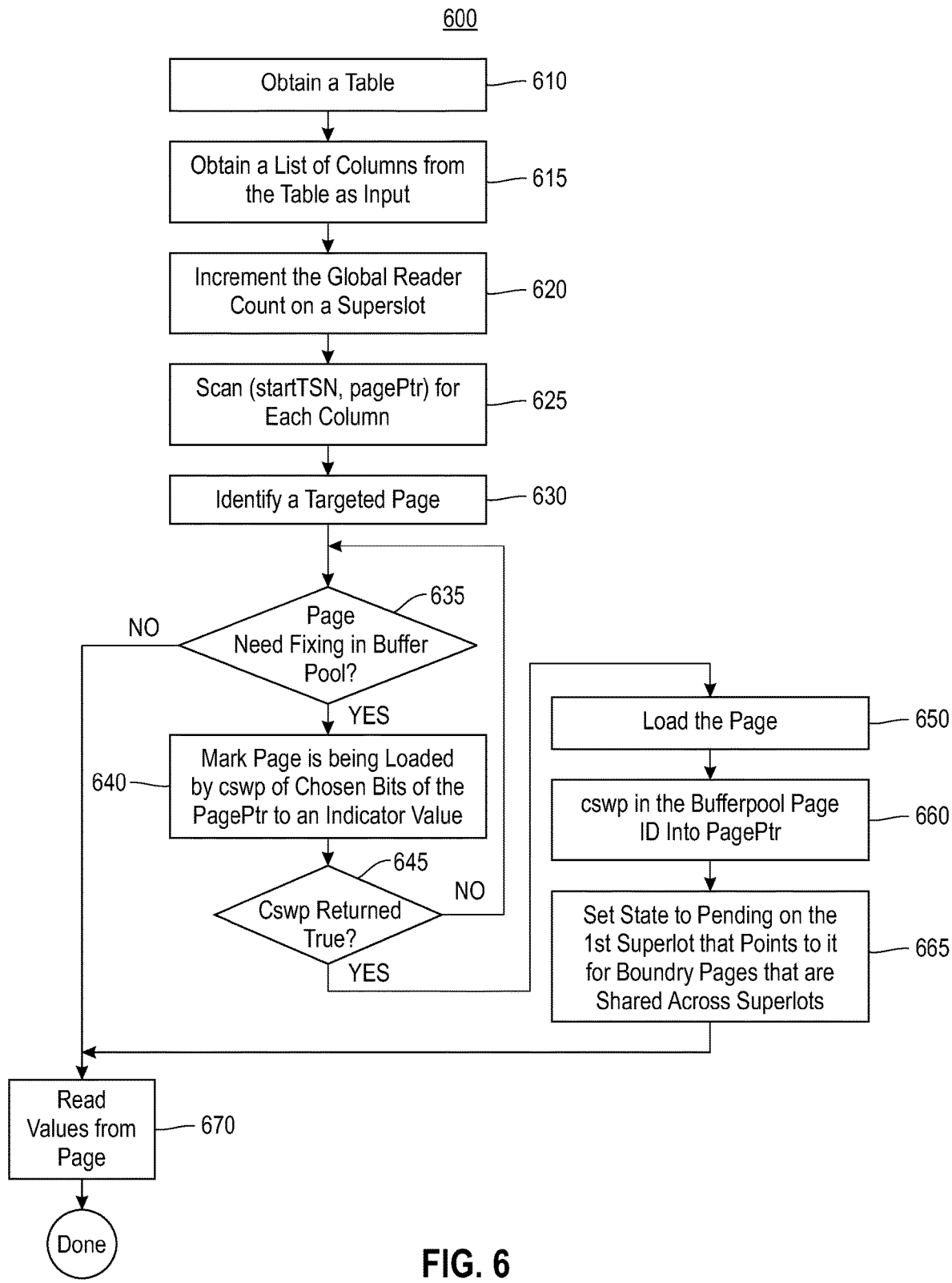
FIG. 6 illustrates a process for mapping tuple sequence numbers (TSNs) to pages for query operations, according to an embodiment.

FIG. 6 illustrates a process 600 for mapping TSNs to pages (TSN→pages) for point query operations, according to an embodiment. In one embodiment, in block 610 a table (or object) to be accessed is obtained from the query. In one embodiment, in block 615 a list of columns (e.g., sub-objects) for the table is obtained from the query, indicating the columns that need to be accessed. The superslot then increments the access count for each of those columns (for example, by performing superslot.cols.numreaders++ (on the needed columns)). In one embodiment, in block 620 a global reader counter is incremented on a superslot data structure. In one embodiment, in block 625 a scan is performed for each column (scan (startTSN, pagePtr).

In one embodiment, in block 630 a targeted page is identified. In one embodiment, in block 635 it is determined if the page needs fixing in the buffer pool. Page fixing is the operation that fixes/pins/keeps the page in the buffer pool, first reading it into the buffer pool from persistent storage (disk or ssd) if it is not currently present, and keeping it there for the duration of some operation on the page until the page is un-fixed/un-pinned after which point the buffer pool could decide to evict the page. In one embodiment, the determination in block 635 is based on whether the targeted page is present in the buffer pool already or not. In one embodiment, if the buffer pool page needs fixing (allocation), in block 640 a page that is being loaded is marked by performing a compare-and-swap (cswp) for chosen bits of the PagePtr to an indicator value which specifies that the page load is in progress and others should not try to load the page. In one embodiment, in block 645 it is determined if the cswp returned true or not. In one embodiment, if the cswp does not return a true value, then process 600 continues to block 635. In one embodiment, if the cswp has returned a true value, the process continues to block 650 where the page is loaded.

In one embodiment, in block 660 a cswp in the buffer pool page ID into the PagePtr is performed to indicate that the page load has completed and that the page is ready for use. In one embodiment, in block 665, the state is set to pending on the first superslot that points to it, in the case of boundary pages that are shared across superslots. In one embodiment, for pages that are not unfixed when the transaction finishes, a superslot-level latch is used to decide which ones can be unfixed (superslot.cols.readerCount). In one embodiment, for BI queries, process 600 may be used except that the reader count is incremented only on the needed columns. In one embodiment, process 600 continues to block 670 where values are read from a page, and the process 600 completes.

Figure 7:
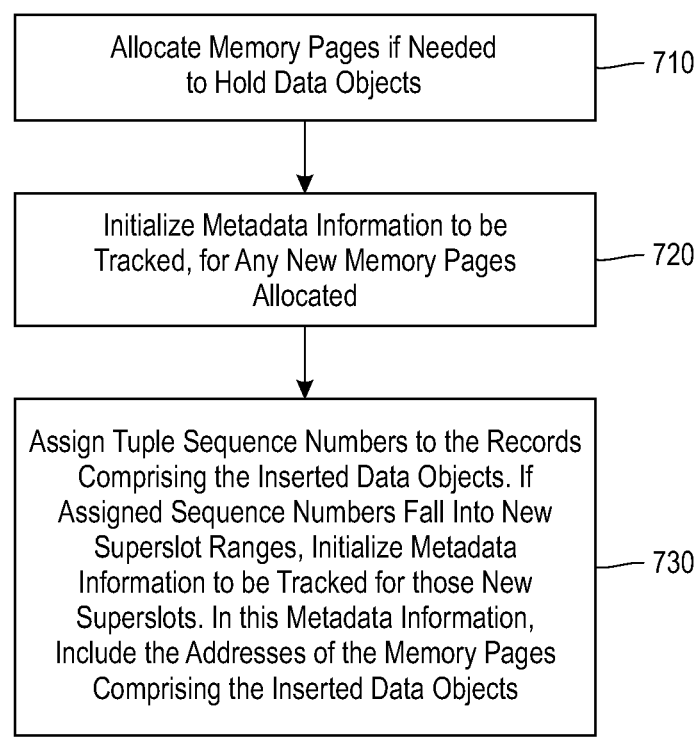
FIG. 7 illustrates a process for inserting data objects into pages and initializing metadata in superslots, according to an embodiment.

FIG. 7 illustrates a process for inserting data objects and initializing metadata in superslots for tracking access metadata, according to one embodiment. In one embodiment, block 710 the data objects are allocated memory pages where they will be stored. In block 720, if any new memory pages needed to be allocated to store these data objects, the metadata is initialized for tracking access information for these pages. In block 730, TSNs are assigned to these objects. In one embodiment, if any of the TSNs falls outside the range of existing superslots, new superslots are created and initialized. In these new superslots are stored the addresses of the memory pages holding the objects falling at those TSNs.

Figure 8:
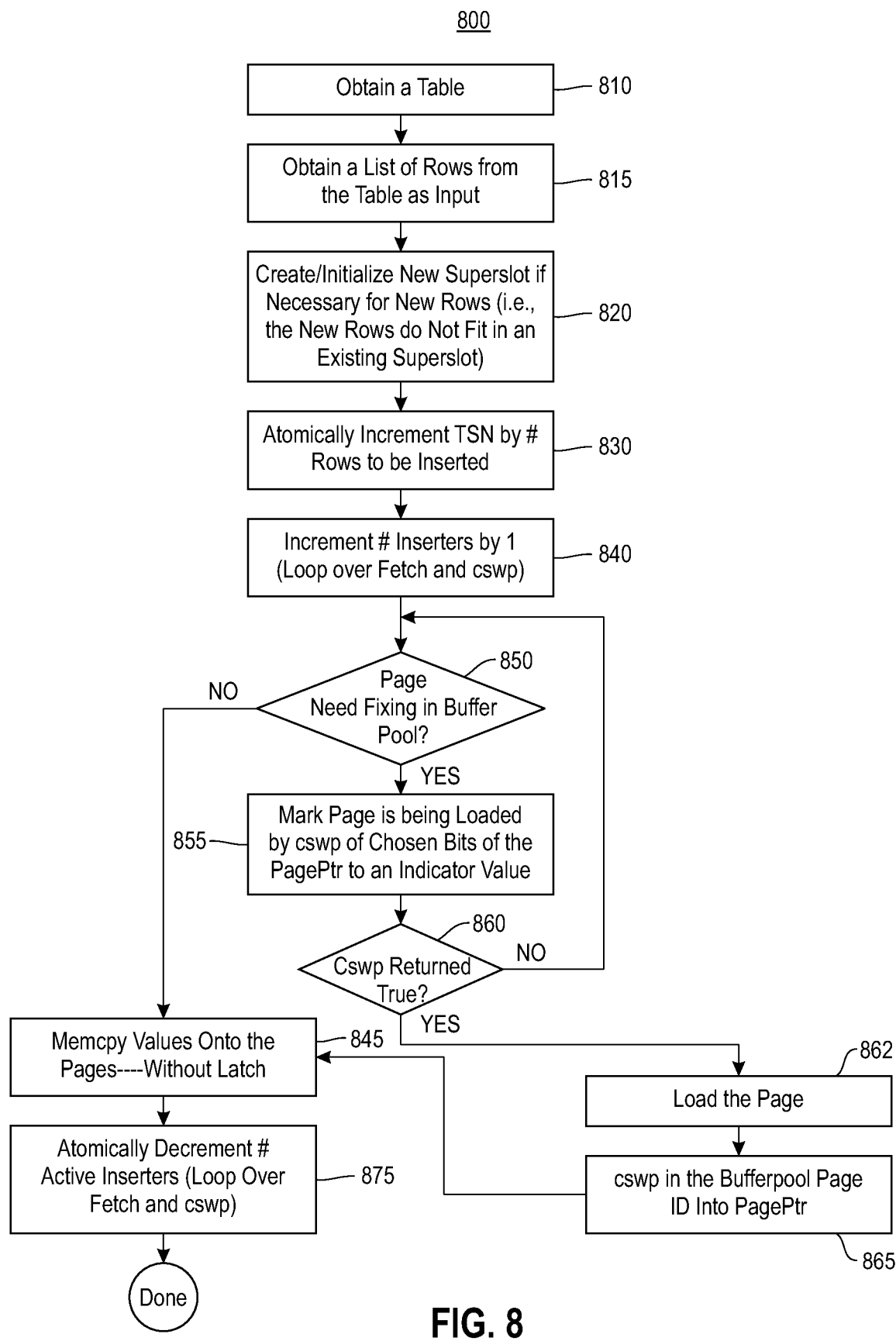
FIG. 8 illustrates a process for mapping TSNs to pages for insert operations, according to an embodiment.

FIG. 8 illustrates a process 800 for mapping TSNs to pages for insert operations in which all of the column values have a fixed length, according to an embodiment. In one embodiment, in block 810 a table (or object) is obtained from storage. Each inserter thread knows exactly how many rows to append and picks up the rows to insert. Each superslot has two atomically modified counters: max used TSN on that superslot and the number of active inserter threads on that superslot. In one embodiment, in block 815, a list of rows (or sub-objects) is obtained from the table. In one embodiment, in block 820 a superslot is initialized if needed for any of the new rows. When a superslot is initialized, all the slots (a slot is a (startTSN, page pointer)) are filled with pages allocated on table space as needed (all slots filled, pages allocated. In one embodiment, for the insert operation, in block 830 the TSN is atomically incremented by the number of rows to be inserted. In block 840 the number of inserters is incremented by one (loop over fetch and cswp).

In one embodiment, in block 850 it is determined if the page needs fixing in the buffer pool. In another embodiment, this may be provided by allocating all the pages when the superslot is initialized in block 820. In one embodiment, the determination in block 850 is based on whether the targeted page is present in the buffer pool already or not. In one embodiment, if pages do not need fixing in the buffer pool, control flows to block 845. In one embodiment, if the pages need fixing in the buffer pool, in block 855 an atomical compare-and-swap (cswp) for the last few bits of the PagePtr is performed, to a state indicating that load is pending for that page. In one embodiment, in block 860 it is determined if the cswp returns a true value or not. In one embodiment, if the cswp does not return a true value, process 800 continues back to block 850. In one embodiment, if the cswp has returned a true value, the process continues to block 862 where the page is loaded, and then to block 865 where the address (buffer pool page ID) of the loaded page is stored in PagePtr via another cswp operation. Subsequently control flows to block 845.

In one embodiment, in block 845 a memory copy (memcpy) for values onto the pages is performed (mapping of TSN to pages is done by scanning the slots), without additional latches. In one embodiment, control then flows to block 875 where the number of active inserters is atomically decremented, by performing a loop of fetch and cswp instructions, when this count is at 0, background operations such as index updating, compression and space reclaim may access this superslot because its contents are stable.

In one embodiment, for handling variable-length columns, each inserter thread, under a latch, increments a counter indicating the number of bytes to be used (a separate such counter for each variable-length field). Once this counter is incremented, the thread has reserved space for the variable-length data it needs to insert. When the number of such variable-length columns is small, this can also be done via atomics or hardware transactional memory.

In one embodiment, each table has an array of pointers to superslots and an atomic indicating the number of used superslots. If an inserter needs to insert more rows than will fit on a superslot, the inserter first inserts as many as will fit. Then the inserter forms a new superslot for the rest. This involves a latch and a wait, one thread will successfully increment the number of used superslots atomically, and then form a new superslot, and cswp in a pointer to it; while any other threads trying to do the same have to wait. To make waits rare, in one embodiment the process 800 proactively forms a superslot when the previous superslot becomes more than half full.

Figure 9:
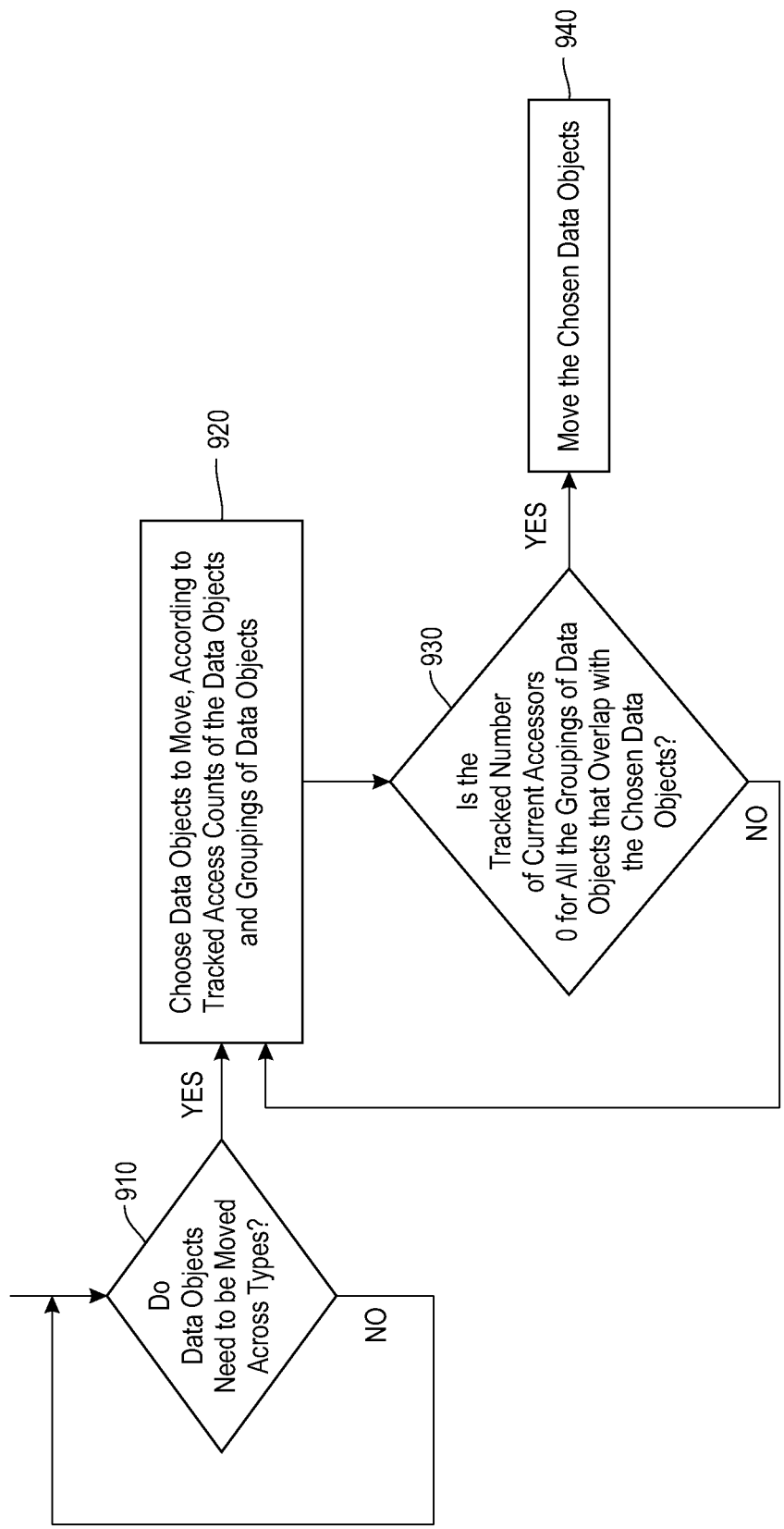
FIG. 9 is a block diagram of a process for dynamically moving hierarchical data objects across two or more kinds of memories based on tracking levels of access of a subset of the data objects, according to an embodiment.

FIG. 9 is a block diagram of a process for dynamically moving hierarchical data objects across two or more kinds of memories based on tracking levels of access of the data objects, according to an embodiment. In one embodiment, in block 910 it is determined if data objects need to be moved across different types of memory (e.g., static RAM, dynamic RAM, hard disks and solid state disks). If it is determined that data blocks need to be moved across different types of memory, in block 920, data blocks are chosen to be moved according to tracked access counts of the data objects and data object groupings. Otherwise, the process proceeds back to the start and block 910. In block 930 it is determined if the tracked number of current accessors is zero for all of the groupings of data objects that overlap with the chosen data objects. If block 930 is false, the process continues back to block 920. Otherwise, the process continues to block 940. In block 940, the chosen data blocks are moved across different types of memory.

In one embodiment, the process may include logically organizing, by an object hierarchy processor, data objects in a first hierarchy. In one example, a portion of the data objects in the first hierarchy logically comprise groupings of other data objects. In one embodiment, the process further includes physically organizing, by the object hierarchy processor, the data objects across two or more types of memory in a second hierarchy. In one example, another portion of the data objects in the second hierarchy physically comprise groupings of other data objects. The process further includes dynamically moving groupings of the data objects in the second hierarchy across the two or more types of memory, tracking levels of access of the data objects using a data structure that maps groupings of the data objects in the first hierarchy onto metadata information including combined access frequencies of the data objects, and current number of accessors (e.g., clients, threads, processes, etc.) to the data objects, in each grouping of the data objects.

In one embodiment, the process may include determining whether to move each grouping of the data objects based on the tracked levels of access of the data object groupings in the first hierarchy that overlap with the grouping of data objects targeted for moving. In one embodiment, the second hierarchy comprises memory pages and individual values, and the first hierarchy comprises data records, sequences of the data records, and individual values. In one example, infrequently accessed data objects and data objects that the infrequently accessed data objects are moved to slower types of memory. In one embodiment, prior to moving a particular data object, a verification is performed using tracked levels of access information that a current number of accessors is zero for all groupings of data objects that overlap with the particular data object, and a determination to move a data object is based on a predetermined least recent access time.

In one embodiment, the arrangement of data objects in a sequence of data records is indicated by a TSN, and the metadata information includes addresses of one or more memory pages holding a grouping of data objects. In one example, the data structure comprises a list of logical groupings of a particular number of contiguous TSNs identifying logical collections of data records, and a list of the metadata information for logical groupings of data objects. In one embodiment, upon execution of an operation that adds additional data objects, one or more memory pages are allocated as needed to hold the additional data objects, and the allocated memory pages determine an assignment of the data objects to groupings in the second hierarchy, and the additional data objects are also assigned to one or more groupings in the first hierarchy.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   logically organizing, by an object hierarchy processor, data objects in a first hierarchy, wherein a portion of the data objects in the first hierarchy logically comprise groupings of other data objects, each logical grouping containing a certain number of contiguous logical records, identified individually by tuple identifiers as tuple sequence numbers (TSNs);
   physically organizing, by the object hierarchy processor, the data objects across two or more types of memory in a second hierarchy, wherein another portion of the data objects in the second hierarchy physically comprise groupings of other data objects;
   dynamically moving groupings of the data objects in the second hierarchy across the two or more types of memory;
   tracking levels of access of groups of the data objects using an across-column data structure, organized at a particular number of rows, that maps ranges of tuple sequence numbers of the data objects in the first hierarchy onto metadata information including combined access frequencies of the data objects, and current number of accessory to the data objects, in each grouping of the data objects, wherein the across-column data structure comprises, for each column of data: an array pair of a starting tuple sequence number (startTSN) and pointer (pagePTR) to a memory page (startTSN, pagePTR), the startTSN is a TSN of the starting TSN in each memory page for a particular column of data, a pagePTR is a union of pointers across the first hierarchy and the second hierarchy, the across-column data structure stores a direct mapping from an identifier for a particular row to a virtual memory address of all data pages straddling the particular row in any column are stored in the across-column data structure, and coarse reference counting, to record all active reference to rows of the across-column data structure, is performed outside of any database buffer pool in the across-column data structure while maintaining separate reference counts for each column;
   receiving a query with a list of columns for the table;
   incrementing the access count for each of the columns and a global reader counter in the across-column data structure;
   scanning (startTSN, pagePTR) for each column of the list of columns;
   identifying a targeted page based on a determination that the targeted page is present in the first hierarchy; and
   reading values from the target page and returning to the query.

2. The method of claim 1, further comprising:
   determining whether to move each grouping of the data objects based on the tracked levels of access of the data object groupings in the first hierarchy that overlap with the grouping of data objects targeted for moving.

3. The method of claim 2, wherein the second hierarchy comprises memory pages and individual values, and the first hierarchy comprises data records, sequences of the data records, and individual values.

4. The method of claim 3, wherein:
   the arrangement of data objects in a sequence of data records is indicated by a TSN, and the metadata information includes addresses of one or more memory pages holding a grouping of data objects;
   the pointer to a page comprises a union of pointers across memory hierarchy; and
   the across-column data structure further comprises, for each column of data: reference counts for each column of data, and a global reference count that records all active references to rows of the across-column data structure.

5. The method of claim 4, wherein upon execution of an operation that adds additional data objects, one or more memory pages are allocated as needed to hold the additional data objects, and the allocated memory pages determine an assignment of the data objects to groupings in the second hierarchy, and the additional data objects are also assigned to one or more groupings in the first hierarchy.

6. The method of claim 1, wherein infrequently accessed data objects and data objects that the infrequently accessed data objects are moved to slower types of memory, and the types of memory comprise static RAM, dynamic RAM, hard disks and solid state disks.

7. The method of claim 6, wherein prior to moving a particular data object, a verification is performed using tracked levels of access information that a current number of accessors is zero for all groupings of data objects that overlap with the particular data object, and a determination to move a data object is based on a predetermined least recent access time.

8. A computer program product for moving hierarchical data objects across two or more kinds of memories, the computer program product comprising a computer readable storage medium having program code embodied therewith, the program code executable by a processor to:
   logically organize, by the processor, data objects in a first hierarchy, wherein a portion of the data objects in the first hierarchy logically comprise groupings of other data objects, each logical grouping containing a certain number of contiguous logical records, identified individually by tuple identifiers as tuple sequence numbers (TSNs);
   physically organize, by the processor, the data objects across two or more types of memory in a second hierarchy, wherein another portion of the data objects in the second hierarchy physically comprise groupings of other data objects;

dynamically move, by the processor, groupings of the data objects in the second hierarchy across the two or more types of memory;

track levels, by the processor, of access of groups of the data objects using an across-column data structure, organized at a particular number of rows, that maps ranges of tuple sequence numbers of the data objects in the first hierarchy onto metadata information including combined access frequencies of the data objects, and current number of accessors to the data objects, in each grouping of the data objects, wherein the across-column data structure comprises, for each column of data: an array pair of a starting tuple sequence number (startTSN) and pointer (pagePTR) to a memory page (startTSN, pagePTR), the startTSN is a TSN of the starting TSN in each memory page for a particular column of data, a pagePTR is a union of pointers across the first hierarchy and the second hierarchy, the across-column data structure stores a direct mapping from an identifier for a particular row to a virtual memory address of all data pages straddling the particular row in any column are stored in the across-column data structure, and coarse reference counting, to record all active reference to rows of the across-column data structure, is performed outside of any database buffer pool in the across-column data structure while maintaining separate reference counts for each column;

receiving a query with a list of columns for the table:

incrementing the access count for each of the columns and a global reader counter in the across-column data structure;

scanning (startTSN, pagePTR) for each column of the list of columns;

identifying a targeted page based on a determination that the targeted page is present in the first hierarchy; and reading values from the target page and returning to the query.

9. The computer program product of claim 8, further comprising program code executable by a processor to: determine, by the processor, whether to move each grouping of the data objects based on the tracked levels of access of the data object groupings in the first hierarchy that overlap with the grouping of data objects targeted for moving.

10. The computer program product of claim 9, wherein the second hierarchy comprises memory pages and individual values, and the first hierarchy comprises data records, sequences of the data records, and individual values and infrequently accessed data objects and data objects that the infrequently accessed data objects are moved to slower types of memory, and the types of memory comprise static RAM, dynamic RAM, hard disks and solid state disks.

11. The computer program product of claim 10, wherein prior to moving a particular data object, a verification is performed using tracked levels of access information that a current number of accessors is zero for all groupings of data objects that overlap with the particular data object.

12. The computer program product of claim 10, wherein a determination to move a hierarchical data object is based on a predetermined least recent access time.

13. The computer program product of claim 10, wherein the arrangement of data objects in a sequence of data records is indicated by a TSN, and the metadata information includes addresses of one or more memory pages holding a grouping of data objects.

14. The computer program product of claim 13, wherein the pointer to a page comprises a union of pointers across memory hierarchy, and the across-column data structure further comprises, for each column of data: reference counts for each column of data, and a global reference count that records all active references to rows of the across-column data structure.

15. The computer program product of claim 13, wherein upon execution of an operation that adds additional data objects, one or more memory pages are allocated as needed to hold the additional data objects, and the allocated memory pages determine an assignment of the data objects to groupings in the second hierarchy, and the additional data objects are also assigned to one or more groupings in the first hierarchy.

16. A system comprising:

a processor;

two or more storage units coupled to the processor, wherein the two or more storage units comprise different memory types;

an object hierarchy processor that:

logically organizes data objects in a first hierarchy, wherein a portion of the data objects in the first hierarchy logically comprise groupings of other data objects, each logical grouping containing a certain number of contiguous logical records, identified individually by tuple identifiers as tuple sequence numbers (TSNs), physically organizes the data objects across the two or more storage units in a second hierarchy, wherein another portion of the data objects in the second hierarchy physically comprise groupings of other data objects, and dynamically moves groupings of the data objects in the second hierarchy across the two or more storage units;

an access tracking processor that tracks levels of access of groups of the data objects using an across-column data structure, organized at a particular number of rows, that maps ranges of tuple sequence numbers of the data objects in the first hierarchy onto metadata information including combined access frequencies of the data objects, and current number of accessors to the data objects, in each grouping of the data objects, wherein the across-column data structure comprises, for each column of data: an array pair of a starting tuple sequence number (startTSN) and pointer (pagePTR) to a memory page, the startTSN is a TSN of the starting TSN in each memory page for a particular column of data, a pagePTR is a union of pointers across the first hierarchy and the second hierarchy, and the across-column data structure stores a direct mapping from an identifier for a particular row to a virtual memory address of all data pages straddling the particular row in any column are stored in the across-column data structure, and coarse reference counting, to record all active reference to rows of the across-column data structure, is performed outside of any database buffer pool in the across-column data structure while maintaining separate reference counts for each column;

receiving a query with a list of columns for the table;

incrementing the access count for each of the columns and a global reader counter in the across-column data structure;

scanning (startTSN, pagePTR) for each column of the list of columns;

identifying a targeted page based on a determination that the targeted page is present in the first hierarchy; and reading values from the target page and returning to the query.

17. The system of claim 16, wherein the object hierarchy processor further determines whether to move each grouping of the data objects based on the tracked levels of access of the data object groupings in the first hierarchy that overlap with the grouping of data objects targeted for moving.

18. The system of claim 17, wherein:
the second hierarchy comprises memory pages and individual values, and the first hierarchy comprises data records, sequences of the data records, and individual values;
infrequently accessed data objects and data objects that the infrequently accessed data objects are moved to slower types of memory;
the types of memory comprise static RAM, dynamic RAM, hard disks and solid state disks;
prior to moving a particular data object, a verification is performed using tracked levels of access information that a current number of accessors is zero for all groupings of data objects that overlap with the particular data object; and
a determination to move a data object is based on a predetermined least recent access time.

19. The system of claim 18, wherein the arrangement of data objects in a sequence of data records is indicated by a TSN, the metadata information includes addresses of one or more memory pages holding a grouping of data objects, the pointer to a page comprises a union of pointers across memory hierarchy, and the across-column data structure further comprises, for each column of data: reference counts for each column of data, and a global reference count that records all active references to rows of the across-column data structure.

20. The system of claim 19, wherein upon the processor executing an operation that adds additional data objects, one or more memory pages are allocated as needed to hold the additional data objects, and the allocated memory pages determine an assignment of the data objects to groupings in the second hierarchy, and the additional data objects are also assigned to one or more groupings in the first hierarchy.

* * * * *